Figure 1:
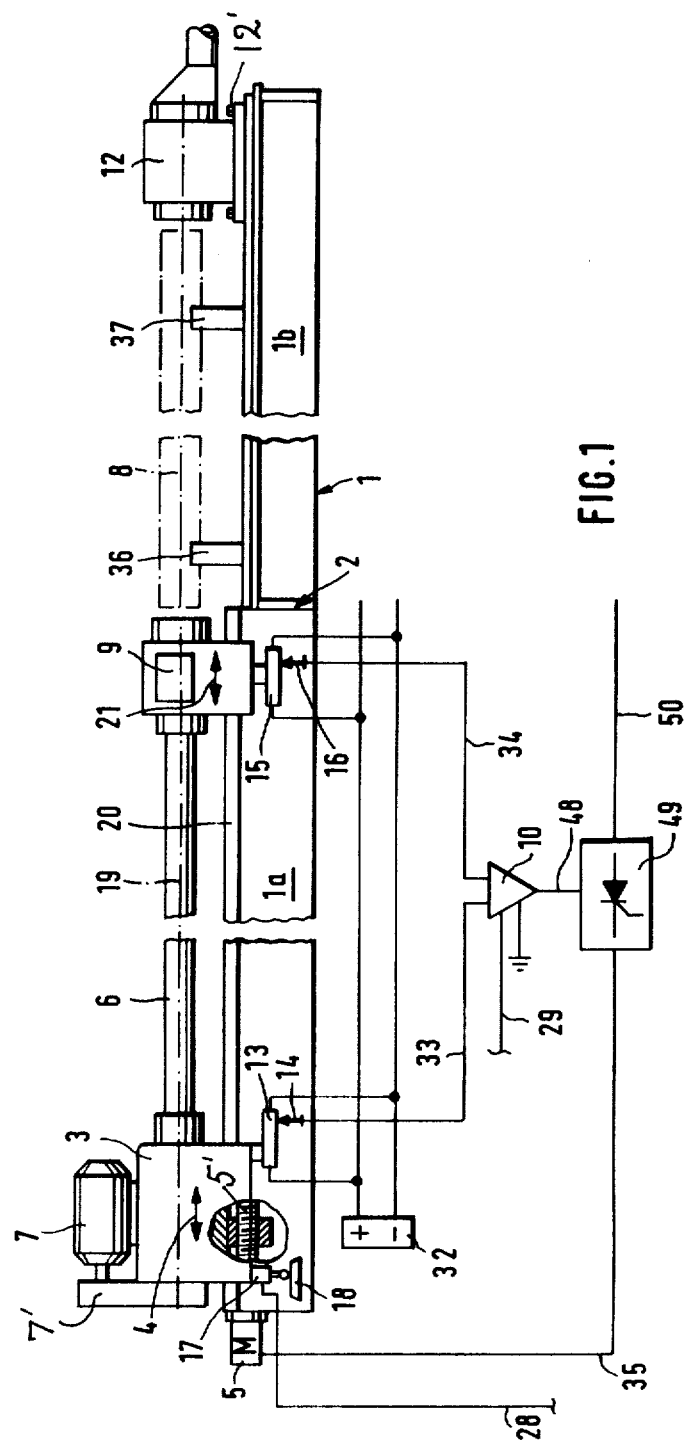

United States Patent [19]

Boesch

[11] 4,377,023
[45] Mar. 22, 1983

[54] DEEP BORING MILL WITH A SYNCHRONEOUSLY OPERATING HEADSTOCK

[75] Inventor: Theo Boesch, Wegberg, Fed. Rep. of Germany

[73] Assignee: Wilhelm Hegenscheidt Gesellschaft mbH, Erkelenz, Fed. Rep. of Germany

[21] Appl. No.: 210,012

[22] Filed: Nov. 24, 1980

[30] Foreign Application Priority Data

Dec. 4, 1979 [DE] Fed. Rep. of Germany ....... 2948693

[51] Int. Cl.³ ............................................. B23B 45/14
[52] U.S. Cl. ..................................... 29/27 R; 408/56
[58] Field of Search ............... 408/56; 29/26 A, 27 R, 29/27 A, 27 C; 82/2.5, 5

[56] References Cited

U.S. PATENT DOCUMENTS 3,817,129 6/1974 Nishimura et al. ...................... 82/5
3,926,078 12/1975 Ishizuka et al. ........................ 82/2.5

FOREIGN PATENT DOCUMENTS 2208508 8/1973 Fed. Rep. of Germany ........ 408/56

Primary Examiner—William R. Briggs
Attorney, Agent, or Firm—W. G. Fasse; D. H. Kane, Jr.

[57] ABSTRACT

A deep boring or drilling mill, especially of the horizontal type, comprises a machine bed. A headstock and a tailsotck are operatively arranged on the machine bed. A cooling medium supply device is operatively arranged between the headstock and the tailstock and participates in or performs a clamping movement. The displacement movements of the headstock and of the cooling medium supply device are synchronized with each other during the clamping phase and during the release phase of these displacement movements. Preferably, the length and speed of the displacement movements are balanced or adjusted by an electrical bridge circuit.

3 Claims, 2 Drawing Figures

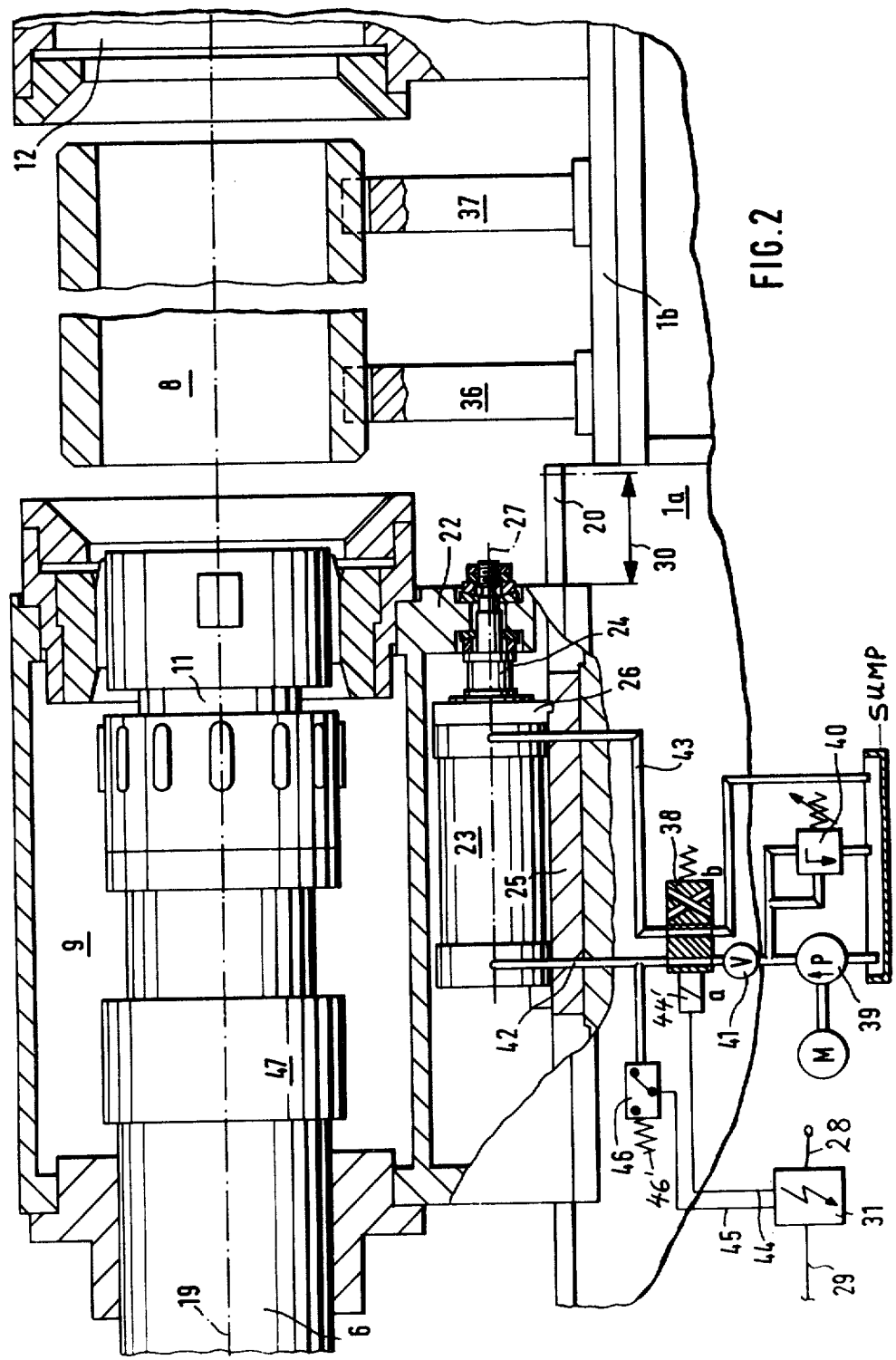

DEEP BORING MILL WITH A SYNCHRONEOUSLY OPERATING HEADSTOCK

CROSS-REFERENCE TO RELATED APPLICATION

The present application corresponds to German Patent Application Pat. No. 2,948,693, filed in the Federal Republic of Germany on Dec. 4, 1979. The priority of said German filing date is expressly claimed.

BACKGROUND OF THE INVENTION

The present invention relates to a deep boring mill with a synchroneously operable headstock, particularly to a horizontal boring mill for drilling holes of substantial depth. Such mills have a machine bed for supporting the respective headstock and the tailstock, whereby the headstock is movable by respective drive means. Further, such machines are equipped with a cooling medium supply device operatively arranged intermediate the head- and tailstock. Normally, the cooling medium supply device performs a clamping movement or participates in such movement. In deep boring mills of this type the boring tool is pulled into the cooling medium supply device for removing the work piece from the mill. This removal is accomplished by moving or displacing the headstock and thus the tool carrying boring tube along the machine bed. Thereafter, the cooling medium supply device which clamps the work piece, is displaced in the release direction. As a result, however, the boring tool again protrudes from the cooling medium supply device so that it is possible that the work piece as well as the tool may be damaged when the work piece is being removed. In order to avoid such damage it is necessary in the prior art to further displace the headstock in order to again pull the tool into the cooling medium supply device. This type of machine operation is time consuming and hence troublesome.

If a work piece is to be clamped in such a boring mill, the operational procedure becomes even more complicated. After the work piece has been placed into the boring mill, the tool must be moved out of the cooling medium supply device to such an extent that the tool does not yet contact the work piece. Thereafter, the cooling medium supply device may be displaced in the clamping direction to the same extent. Even work pieces of the same length may take up different axial positions upon insertion into the mill. Therefore, it is possible that it becomes necessary to repeat the just described movement sequence several times until the cooling medium supply device has displaced the work piece to such an extent that it contacts the tailstock, whereupon it may be clamped with the next displacement movement of the cooling medium supply device.

The operation of the above described machines could be simplified and thereby the operational time per work piece reduced if the so-called plunging space available for the boring tool in the cooling medium supply device would be sufficiently deep in order to permit all movements that are required to be performed by the cooling medium supply device without moving the boring tool for this purpose. Such a solution is basically possible, however, it requires a cooling medium supply device of substantial or very large size which in turn calls for a correspondingly longer machine bed.

OBJECTS OF THE INVENTION

In view of the above it is the aim of the invention to achieve the following objects singly or in combination:
  to eliminate the above mentioned operation problems in deep boring mills of the type described above without increasing or varying the structural size of such machines;
  to enable the movements in the clamping direction and in the work piece release direction without any need for paying attention to the position or location of the work piece in the mill; and
  to make sure that the boring tool retains the same axial position within the cooling medium supply device during all the movements of the supply device.

SUMMARY OF THE INVENTION

According to the invention the above objectives are achieved in a machine described above in that during the clamping phase and during the releasing phase the displacement movements of the headstock and of the cooling medium supply device are synchronized with each other. This synchronization makes sure that the boring tool retains at all times the same axial position in the cooling medium supply device, whereby the latter may be moved in any desired manner without running the risk that the boring tool extends out of the cooling medium supply device at either end thereof. Hence, the boring tool cannot hit the tailstock or protrude from the front portion of the supply device. Accordingly, any clamping and/or releasing movements can be performed without paying any attention to the position of the tool.

The synchronization of the movement of the headstock with the movement of the cooling medium supply device may be accomplished in an especially simple manner by employing an electrical bridge circuit which is balanced with regard to the displacement and the speed of the headstock and the cooling medium supply device.

BRIEF FIGURE DESCRIPTION

In order that the invention may be clearly understood, it will now be described, by way of example, with reference to the accompanying drawings, wherein:

FIG. 1 shows, somewhat schematically, a front view of a horizontal deep boring mill with a balancing circuit arrangement according to the invention; and FIG. 2 is a partial view of the drive means or displacement mechanism for the cooling medium supply device.

DETAILED DESCRIPTION OF PREFERRED EXAMPLE EMBODIMENTS AND OF THE BEST MODE OF THE INVENTION

FIG. 1 shows a machine bed 1 having a section 1a carrying the headstock 3 movable back and forth in the direction of the double arrow 4 by first drive means 5 such as a feed advance motor operating a spindle 5' for the displacement of the headstock 3 in a manner known as such. The headstock 3 holds the boring tube 6 which is rotated by a drive motor 7 through respective gear means 7'. Simultaneously, the boring tube 6 may be displaced in the horizontal, axial direction by means of the headstock 3 as indicated by the arrow 4. A coil 13 of a wiper contact potentiometer is operatively secured to the headstock 3. The wiper contact 14 of the potentiometer is rigidly secured in a stationary position to the portion 1a of the machine bed 1.

Further, a cam operated switch 17 is also secured to and carried by the headstock 3 and the respective cam 18 is secured to the machine bed portion 1a in a predetermined fixed position. The cam operated switch 17 is electrically connected with the machine control system 31 through the electrical conductor 28.

As shown in FIG. 2 the boring tube 6 carries at its right-hand end a tool 11 for the internal machining of the work piece 8. The cooling supply device 9 is equipped with means for guiding the boring tube 6 relative to the central, horizontal axis 19. As mentioned, the cooling medium supply device 9 is also movably supported on the bed portion 1a of the machine bed 1. Second drive means 23 to be described in more detail below are arranged for moving the cooling medium supply device 9 back and forth along the machine bed 1a as indicated by the arrow 21. A further coil 15 of a displacement potentiometer is operatively secured to the moving housing of the device 9 for cooperation with a stationary wiper contact 16 secured to the machine bed portion 1a of the machine bed 1.

Both coils 13 and 15 are connected in parallel to a voltage source 32. The wiper contacts 14 and 16 are connected through the electrical conductors 33 and 34 to the inputs of an amplifier 10 which in turn is connected with its output through the conductor 48 to a thyristor device 49. A further input of the amplifier 10 is connected through the conductor 29 to the machine control 31. The thyristor device 49 is connected through the conductor means 50 to a power supply and through the conductor means 35 to the feed advance motor 5.

The machine bed 1 comprises a further bed portion 1b operatively connected to the portion 1a at the junction or interface 2. A tailstock 12 is operatively arranged on the machine bed portion 1b at the end thereof pointing away from the cooling medium supply device 9. The tailstock 12 is longitudinally displaceable and lockable in an adjusted position along the length of the machine bed portion 1b in a manner known in the art. The locking of the tailstock 12 in any desired position may be accomplished by clamping screws 12'.

FIG. 2 shows the details of the cooling medium supply device 9 which is slidable back and forth along the guide rails 20 of the machine bed portion 1a. However, the back and forth movement as indicated by the arrow 21 is limited to the range of the clamping width or stroke 30. For this purpose the cooling medium supply device 9 is operatively connected through a yoke 22 with the piston rod 24 of the above mentioned second driving means in the form of a fluid drive cylinder 23. The fluid drive cylinder 23 in turn is operatively secured to a support table 25 arranged in the partial bed portion 1a. A cross tongue 26 reaching into a respective groove in the table 25 prevents the cylinder 23 from moving axially back and forth. Thus, the cylinder 23 is rigidly secured to the machine bed. The cylinder 23 is so located relative to the machine bed that its central axis 27 is located in the same vertical plane as the machine center axis 19 and that it is further arranged in parallel to the bed guiding rails 20.

In operation, if a work piece 8 is to be bored or drilled, the cooling medium supply device 9 is initially located in its left end position so that the maximum available spacing is provided at this time between the device 9 and the tailstock 12. The headstock 3 is initially also moved to the left to such an extent that the tool 11 secured in a known manner to the end of the boring tube 6 is located within the device 9 as shown in FIG. 2. Thereafter, a work piece 8 is inserted into the mill and deposited on the support prisms 36 and 37. In order to clamp the work piece 8 for the subsequent milling or boring operation between the device 9 and the tailstock 12, the device 9 is displaced to the right out of the position shown in FIG. 2. For this purpose the valve 38 is activated through the conductor 44 energizing a solenoid 44' in response to a respective signal from the machine control 31 whereby the valve 38 is moved into the position "a". Thus, the fluid medium conveyed by the pump 39 through the pipe 42 and the volume control valve 41 flows to the drive cylinder 23, whereby the piston rod 24 is extended to thereby displace the device 9 in the direction toward the right, namely, toward the tailstock 12. The volume control valve 41 permits controlling or adjusting the speed of the clamping movement of the device 9.

With the displacement of the device 9 the potentiometer coil 15 is also displaced accordingly, whereby different voltages now appear at the wiper contacts 14 and 16. This voltage difference appears at the output of the amplifier 10 for supplying a control signal to the thyristor device 49. As mentioned, the control input of the amplifier 10 is also connected through the conductor 29 to the machine control 31. The thyristor device 49 controls in a closed loop fashion through the conductor 35 the feed advance motor 5, whereby the headstock 3 immediately follows the displacement of the device 9 in the same direction and to the same extent during this workpiece clamping operation or phase. Due to the just mentioned movement of the headstock 3, the coil of the potentiometer 13 is also displaced, thereby re-establishing the balancing as signified by the same voltage appearing at the wiper contacts 14 and 16. Accordingly, the headstock 3 and the cooling medium supply device 9 will always move in the same direction and with the same speed during the clamping of the workpiece.

When the clamping of the work piece 8 is completed, the pressure rise in the cylinder 23 will operate a pressure responsive switch 46 which provides through the conductor 45 a respective signal to the machine control 31. Normally, a spring 46' will keep the pressure responsive switch 46 in a non-activated position. The signal will be provided to the machine control 31 when the pressure in the cylinder 23 exceeds the force of the spring 46'. When the machine control 31 receives the signal from the switch 46, it switches off the amplifier 10 through the conductor 29 to thereby switch off the potentiometer coils 13 and 15, whereupon the drive motor 7 is energized for rotating the boring tube 6. Simultaneously, with the rotation of the boring tube 6, the head stock 3 may be advanced by means of the feed drive motor 5 in any conventional manner in accordance with an external control, for example, by the operator, for axially moving the headstock 3 without a corresponding movement of the cooling medium supply device 9, which means that during a boring operating there is no synchronization between the moving headstock 3 and the device 9. Basically it would also be possible to keep the boring tube 6 stationary and rotate the work piece 8. Additionally, the boring tube 6 could be rotated in one direction and the work piece 8 could be rotated in the opposite direction.

Upon completion of the milling operation the headstock 3 is moved back to such an extent that the cam switch 17 contacts the switching cam 18, whereby the switch 17 provides a signal through the conductor 28 to the machine control 31 for again activating the circuit with the potentiometer coils 13 and 15. As a result, the headstock 3 may only move to such an extent in the return direction until both coils 13 and 15 provide the same voltage at the wiper contacts 14 and 16. At this point the headstock 3 stops.

If now the operator, for example by pushing a switch, instructs the machine control 31 to release the work piece 8, the valve 38 is moved into the position "b" so that the fluid pumped by the pump 39 may flow into the cylinder 23 in the opposite direction, whereby the piston rod 24 is pulled back into the cylinder 24 to thereby move the cooling medium supply device 9 and hence the coil 15 to the left. This left movement of the device 9 in turn causes a voltage difference at the wiper contacts 14 and 16 of the potentiometers 13 and 15, whereby the drive motor 5 again receives an energizing signal from the thyristor device 49 through the conductor 35 in response to the control by the amplifier 10.

Accordingly, the headstock 3 and the device 9 again move in the same direction with the same speed during this workpiece release operation or phase. If the piston rod 24 has moved to the full left position, the movement stops. In this operating condition the pump 39 is protected against an unpermissible pressure increase by the pressure limiting valve 40. This pressure relief valve could be adjusted to a desired pressure level.

By making sure that the headstock 3 and the cooling medium supply device 9 run in synchronism with each other during the clamping operation and during the work piece release but without synchronization during a boring operation, it becomes possible that the tool 11 may remain inside the device 9 during these two operations without any need for the device 9 to abut against the take-up member 47 of the tool 11 during the clamping stroke. The avoidance of such a situation in which the device 9 abuts against the take-up member 47 makes sure that the clamping operation can always be properly completed and that damages to the apparatus including the tool and/or the work piece are avoided. The feature has the further advantage that during the release stroke the tool 11 may completely remain within the protecting zone of the device 9, thereby avoiding interference between the tool 11 and the work piece 8 when the latter is to be removed from the milling apparatus. Thus, the work piece removal and the work piece insertion may be performed unhampered and the tool cannot be damaged by the work piece and vice versa. Thus, the invention makes sure that the maximum available axial space for the insertion and removal of the work piece 8 is not diminished in any way. Additionally, the invention avoids the above described multiple steps necessary heretofore for the displacement of the headstock 3 and the cooling medium supply device 9.

Incidentally, the potentiometers 13 and 15 with their wiper contacts 14 and 16 could be realized by a linear type transducer made by the company "Megatron" as type WQ 100. The voltage supply source 32 could be of the type GEV 2200 SIMADYN C made by the Firm Siemens. The amplifier 10 could be an opertional amplifier type 6 DC 1004 SIMADYN C also made by Siemens. The thyristor device 49 could be of the type TPA 3230 made by "Inland". The motor 5 could be of the type TT 2923-20A also made by Inland. The machine control 31 could be of the type SPS-60-24128 made by Standard Electric.

Although the invention has been described with reference to specific example embodiments, it will be appreciated, that it is intended, to cover all modifications and equivalents within the scope of the appended claims.

What is claimed is:

1. A deep boring apparatus, comprising machine bed means (1), headstock means (3) with means to support a boring tool and operatively supported on said machine bed means for movement back and forth on said machine bed means, tailstock means (12) with means to support a workpiece and operatively supported on said machine bed means (1), cooling medium supply means (9) having means for receiving said boring tool and means for clamping said workpiece and movably supported on said machine bed means (1) intermediate said headstock means (3) and said tailstock means (12), first drive means (5) operatively connected to said headstock means (3) for moving the headstock means (3) back and forth along said machine bed means, second drive means (23) operatively connected to said supply means (9) for moving the supply means (9) back and forth along said machine bed means (1), synchronizing means (13, 15) operatively connected to said first and second drive means for synchronizing the displacement movements of said headstock means (3) and of said supply means (9) and means controlling said synchronizing means to be operable only during the workpiece clamping phase and during the workpiece release phase of said displacement movements without a synchronization during a boring operation.

2. The apparatus of claim 1, wherein said synchronizing means comprise electrical bridge circuit means operatively connected to said first and second drive means for adjusting the displacement and the speed of the headstock means and of the cooling medium supply means only during the clamping phase and during the workpiece release phase.

3. The apparatus of claim 1 or 2, further comprising a tool carrying boring tube (6) supported by said headstock (3), and wherein said cooling medium supply device (9) comprises means for guiding the boring tube (6).

* * * * *